(12) United States Patent
Nilsson (10) Patent No.: US 10,106,366 B2
(45) Date of Patent: Oct. 23, 2018

(54) METHOD FOR PRODUCING A CABLE SPOOL WITH ROUNDED EDGES

(71) Applicant: Axjo Plastic AB, Gislaved (SE)

(72) Inventor: Jacob Nilsson, Anderstorp (SE)

(73) Assignee: AXJO PLASTIC AB, Gislaved (SE)

( * ) Notice: Subject to any disclaimer, the term of this patent is extended or adjusted under 35 U.S.C. 154(b) by 211 days.

(21) Appl. No.: 15/213,866

(22) Filed: Jul. 19, 2016

(65) Prior Publication Data
US 2018/0022570 A1    Jan. 25, 2018

(51) Int. Cl.
*B29C 45/26*    (2006.01)
*B65H 75/14*    (2006.01)
*B29C 45/44*    (2006.01)
*B29K 23/00*    (2006.01)
*B29L 31/00*    (2006.01)

(52) U.S. Cl.
CPC ............. *B65H 75/14* (2013.01); *B29C 45/44* (2013.01); *B29C 45/2628* (2013.01); *B29C 2045/445* (2013.01); *B29K 2023/06* (2013.01); *B29K 2023/12* (2013.01); *B29L 2031/704* (2013.01); *B65H 2701/5122* (2013.01)

(58) Field of Classification Search
CPC ................ B29C 45/2628; B29C 45/44; B29C 2045/445
See application file for complete search history.

(56) References Cited

U.S. PATENT DOCUMENTS

| | | | | |
|---|---|---|---|---|
| 2,990,133 A * | 6/1961 | Tucker, Jr. | ............. | B65H 75/14 242/118.7 |
| 3,243,490 A * | 3/1966 | Ulmschneider | ......... | B29C 45/33 264/318 |
| 3,501,110 A * | 3/1970 | Green | ................. | B29C 65/0672 242/118.7 |
| 5,967,455 A * | 10/1999 | Farber | .................... | B65H 75/14 242/118.31 |
| 6,283,745 B1 * | 9/2001 | Suzuki | ................ | B29C 33/3828 249/135 |

* cited by examiner

*Primary Examiner* — James Sanders
(74) *Attorney, Agent, or Firm* — Buchanan Ingersoll & Rooney P.C.

(57) ABSTRACT

A method for producing a cable spool including the steps of providing a mold for producing a cable spool, assembling said mold by joining said at least two central mold pieces and said first and second flange mold pieces, adding molten polymer material to said mold, removing said mold and cooling said cable spool. Also, a mold for producing a cable spool, said mold including at least two central mold pieces, a first flange mold piece and a second flange mold piece. Also, a plastic cable spool including a barrel and two annular flanges located at opposite ends of said barrel, wherein each one of said flanges has an inward facing side directed towards said other flange and an outward facing side, and each one of said flanges includes a through-hole extending between said inward facing side and said outward facing side.

19 Claims, 6 Drawing Sheets

METHOD FOR PRODUCING A CABLE SPOOL WITH ROUNDED EDGES

FIELD OF THE INVENTION

The present invention relates to a method for producing a cable spool by molding. It also relates to a mold for producing a cable spool and to a plastic cable spool.

BACKGROUND

Different kinds of cable spools are being used for carrying and transporting various types of cables and wires, such as electric cables, fiber optic cables and wire products. Cable spools can be made of e.g. wood, plywood, steel and plastic.

A commonly used spool for house wiring cables in the US is a 6.5" diameter cable spool. Such cable spools can be arranged for use in automated, high speed cable wiring application. Plastic cable spools may be produced in many different manners, e.g. by producing parts that are thereafter snap-fitted, welded or glued together. In order to provide for a stronger and more durable product, it is desirable to produce as much as possible of the product in one piece.

When winding cables onto such cable spools using automated, high speed cable wiring application, a common problem is that the cable jacket runs a risk of being damaged by friction between the cable spool and the cable. This renders part of the cable unusable and thus, the total length of cable delivered with each cable spool is reduced. Currently, this is considered an inevitable loss of cable when using automated, high speed cable winding applications. However, a solution which reduces cable waste and thus lowers costs would be preferable.

SUMMARY OF THE INVENTION

An object of the present invention is therefore to alleviate the abovementioned problems. The invention is based on the insight that a cable spool having a convex edge on its start hole will reduce the amount of wear on the cable. The present invention therefore provides such a cable spool as well as a method and a mold for producing a cable spool for use in automated cable winding applications, wherein a start hole of said cable spool has a convex edge for reducing the amount of wear it exerts on a cable that is being winded onto said cable spool.

Thereby, the above and other objects which will be evident from the following description are achieved by the present invention.

According to a first aspect of the present invention, a method for producing a cable spool is provided, the method comprising the steps of:

providing a mold for producing a cable spool, the mold comprising at least two central mold pieces, a first flange mold piece and a second flange mold piece, the at least two central mold pieces being arranged to collectively define a barrel cavity for producing a barrel of the cable spool, and the first and second flange mold pieces being arranged to together with the at least two central mold pieces define a first annular flange cavity and a second annular flange cavity, respectively, for producing a first and a second annular flange of the cable spool, respectively, the first and second annular flange cavities being provided at either end of the barrel cavity when the mold is assembled, wherein at least a portion of each one of the first and second annular flange cavities is angled outwards 0.1-5° with respect to a plane that is perpendicular to a longitudinal axis of the barrel cavity, wherein at least one of the at least two central mold pieces comprises an inner protrusion for forming at least a portion of a start hole on one of the annular flanges, wherein the inner protrusion is arranged at least partly inside the angled portion of the annular flange cavities, the inner protrusion comprises a chamfered or concave edge for forming a chamfered or convex edge at the start hole, and the inner protrusion comprises a tapered edge, the tapered edge being substantially perpendicular to a longitudinal axis of the barrel cavity and diametrically opposed the chamfered or concave edge;

assembling the mold by joining the at least two central mold pieces and the first and second flange mold pieces;

adding molten polymer material to the mold;

removing the mold;

cooling the cable spool.

An inner protrusion forming at least a portion of a start hole is to be understood as meaning that a part of the depth of the start hole is formed by means of the inner protrusion.

At least a portion of each one of the first and second annular flange cavities being angled outwards is to be understood as meaning that either a portion of the flange cavities or the entire flange cavities is angled outwards. The portion of the flange cavities that is angled outwards is to be understood as being the portion of the flange cavities that comprises the inner protrusion for forming at least a portion of the start hole.

The tapered edge being substantially perpendicular to a longitudinal axis of the barrel cavity is to be understood as meaning that the tapering surface formed by the tapering of the edge of the inner protrusion is substantially perpendicular to the longitudinal axis of the barrel.

The tapered edge being diametrically opposed the chamfered or concave edge is to be understood as meaning that the tapered edge is located on an opposite side of a midpoint of the start hole. This means that if the start hole is shaped as a rectangle, diametrically opposed means two opposite edges of the rectangle. If the start hole were to be shaped as a circle, diametrically opposed would mean on two portions of the circle arranged on opposite sides of the start hole.

The inner protrusions being provided with a chamfered or concave edge is to be understood as meaning that the intersection of the inner protrusions and the central mold piece is arranged as a concave or chamfered portion. The cross-section of the intersection of the inner protrusion and the central mold piece is what defines the cross-section of the inner edge of the start hole, i.e. a smooth transition between the inner protrusion and the central mold piece allows for the creation of a start hole having a non-sharp edge.

The inner protrusion being arranged at least partly inside the angled portion of the annular flange cavities is to be understood as meaning that the inner protrusions are provided at least partly at an angle to a longitudinal axis of the barrel cavity. This, in combination with the inner protrusion being provided with a tapering, allows the central mold pieces to be removed from a cable spool created therein without having the inner protrusions damage the inward facing side of the flanges of the cable spool.

According to one exemplary embodiment, the barrel is further provided with four spokes located between an inner barrel and an outer wall of the barrel.

By providing the barrel with four spokes, the cable spool maintains a round shape during use and as it is produced. Providing the barrel with fewer spokes than three has proven unsuitable for producing cable spools that maintain their round shape after production and during use.

According to one exemplary embodiment, each one of the at least two central mold pieces comprises at least two inner protrusions, each one of the at least two inner protrusions being arranged to form at least a portion of a start hole on one of said annular flanges, and each one of the first and second flange mold pieces comprises at least two outer protrusions for defining at least a portion of at least two start holes on the respective annular flange.

By having the mold arranged to produce a cable spool having two start holes on each one of the flanges, ease of operation is achieved as the cable spool can more easily be used with automated cable winding applications. Also, better stability is achieved as the weight of the cable spool is better balanced if it is symmetrical than if it would only have start holes on one of the flanges.

According to one exemplary embodiment, at least two of the inner protrusions each comprises at least one chamfered or concave edge for forming a start hole comprising at least one chamfered or convex edge, wherein the at least two of the inner protrusions are arranged to form at least a portion of at least two start holes on one of the annular flanges.

According to one exemplary embodiment, two of the inner protrusions each comprises two chamfered or concave edges for forming a start hole comprising two chamfered or convex edges, wherein the at least two chamfered or convex edges include the edge which is closest to the barrel cavity and an edge neighboring the edge.

According to one exemplary embodiment, the mold is used to produce the cable spool by means of injection molding.

According to one exemplary embodiment, each inner protrusion has a corresponding outer protrusion, and wherein each pair of inner and outer protrusions is arranged to form a start hole.

According to one exemplary embodiment, at least one of the first and second flange mold pieces comprises at least one outer protrusion for defining at least a portion of at least one start hole on the respective annular flange.

An outer protrusion forming at least a portion of a start hole is to be understood as meaning that a part of the depth of the start hole is formed by the outer protrusions, i.e. that part of the depth is formed by the inner protrusions and part of the depth by the outer protrusions. The inner and outer protrusions could however also be arranged so that the inner protrusion forms the peripheral or circumferential parts of the start hole while the outer protrusion forms the central part of the start hole.

By forming a portion of the start hole by means of an outer protrusion provided on the first and second flange mold pieces, the inner protrusions need not to be as high to create a start hole. Having inner protrusions with a large height would mean that the tapered portion of the inner protrusion would have to be very large in order to allow the central mold pieces to be removed from a cable spool produced therein without damaging the cable spool.

According to one exemplary embodiment, the at least two central mold pieces collectively comprise two inner protrusions for forming at least a portion of two start holes on one of the annular flanges, wherein the inner protrusions are arranged at least partly inside the angled portion of the annular flange cavities, wherein the two inner protrusions comprise tapered edges, the tapered edges being substantially perpendicular to a longitudinal axis of the barrel cavity and diametrically opposed the chamfered or concave edges.

By having the mold arranged to produce a cable spool having two start holes on one of the flanges, ease of operation is achieved as the cable spool can more easily be used with automated cable winding applications.

According to one exemplary embodiment, the concave edge has a radius of 0.1-0.5 mm.

Having the concave edge provided with a radius of 0.1-0.5 mm lowers the risk of damages to the cable as the edge of the cable spool which correlates to the concave edge of the mold, i.e. the edge that the cable comes into contact with, is less sharp. The same benefit can also be achieved by providing the intersection between the inner protrusion and the flange cavity with chamfered edges.

The concave or chamfered edge is to be understood as being located at the intersection between the flange cavity and the inner protrusions. Thus, a start hole can be formed having a radius on an edge on the inward facing side of the flange.

According to one exemplary embodiment, each one of the first and second annular flange cavities is angled outwards 0.5-3.5° with respect to a plane that is perpendicular to a longitudinal axis of the barrel cavity.

Having each one of the first and second annular flange cavities angled outwards 0.5-3.5° is sufficient to allow the central mold pieces to be removed from a cable spool created therein without causing damages to the inward facing sides of the flanges of the cable spool. Also, having each one of the first and second annular flange cavities angled outwards 0.5-3.5° means that the flanges more easily can straighten once they are cooled and change shape into being substantially perpendicular to a longitudinal axis of the barrel.

It should be understood that each one of the first and second annular flange cavities being angled outwards means that the flange cavities are arranged so that the portion of a first flange cavity which is closest to the barrel cavity is the portion of the first flange cavity which is located closest to the second flange cavity. Any other portion of the first flange cavity is located at a greater distance from the second flange cavity.

According to one exemplary embodiment, the polymer material is polypropylene or polyethylene.

Use of these materials ensures that the cable spool can easily be created by injection molding in the mold described herein. These materials also provide a good balance between cost, weight and strength of the cable spool.

According to one exemplary embodiment, the polypropylene or polyethylene has a density of 0.8-1.2 kg/m$^3$.

It has been noted that polypropylene or polyethylene having a density of 0.8-1.2 kg m$^3$ ensures that the strength-to-weight ratio of the cable spool is increased, as well as that costs are kept low.

According to one exemplary embodiment, the polypropylene or polyethylene has a density of 0.92-0.98 kg/m$^3$.

It has been noted that polypropylene or polyethylene having a density of 0.92-0.98 kg/m$^3$ ensures that the strength-to-weight ratio of the cable spool is even further increased, as well as that costs are kept even lower.

According to one exemplary embodiment, the flange cavity is shaped substantially as a baseless, truncated cone, each one of the first and second annular flange cavities pointing towards the other.

The flange cavity being shaped substantially as a baseless, truncated cone is to be understood as meaning that the portion of the flange cavity which borders the barrel cavity constitutes the top portion of a truncated cone, and that the rest of the flange cavity corresponds to the lateral surfaces of a truncated cone. The portion of a first flange cavity which is closest to the barrel cavity, i.e, the portion which corresponds to the top of the truncated cone, is the portion of the first flange cavity which is located closest to the second flange cavity. Any other portion of the first flange cavity is located at a greater distance from the second flange cavity.

Having the flange cavity arranged as a baseless, truncated cone allows the flange cavity to be angled outwards, thus providing the aforementioned benefits of being so. Also, by being arrange as a baseless, truncated cone, the flange cavities can achieve a more symmetrical shape. Thus, the flanges can more easily straighten when they are cooled.

According to one exemplary embodiment, whereby upon cooling, the first and second annular flanges of the cable spool change shape into substantially flat discs arranged substantially perpendicular to a longitudinal axis of the barrel.

It is to be understood that this change of shape occurs due to the fact that the material in the cable spool shrinks when it cools, thus causing the flange to straighten.

Having a cable spool with flanges that are not angled outwards is beneficial as it allows for better stability and rigidity of the cable spool. Also, the cable spools are more easily stored if the flanges are straight and not angled outwards.

According to one exemplary embodiment, the chamfered or concave edge is the edge which is closest to the barrel cavity.

The chamfered or concave edge being the edge which is closest to the barrel cavity is beneficial as this lowers the amount of cable wear, as this edge corresponds to the edge of the cable spool which the cable comes into most contact with.

According to one exemplary embodiment, the inner protrusion comprises three chamfered or concave edges for forming a start hole comprising three chamfered or convex edges, wherein the three chamfered or convex edges include the edge which is closest to the barrel cavity and the two edges neighboring the edge.

The inner protrusion being provided with three chamfered or concave edges is beneficial as this further reduces the amount of cable wear, due to the fact that these edges correspond to the three edges which can cause cable wear.

According to a second aspect of the present invention, a mold for producing a cable spool is provided, the mold comprising:

at least two central mold pieces, a first flange mold piece and a second flange mold piece, the at least two central mold pieces being arranged to collectively define a barrel cavity for producing a barrel of the cable spool, and the first and second flange mold pieces being arranged to together with the at least two central mold pieces define a first annular flange cavity and a second annular flange cavity, respectively, for producing a first and a second annular flange of the cable spool, respectively, the first and second annular flange cavities being provided at either end of the barrel cavity when the mold is assembled, wherein at least a portion of each one of the first and second annular flange cavities is angled outwards 0.1-5° with respect to a plane that is perpendicular to a longitudinal axis of the barrel cavity, wherein at least one of the at least two central mold pieces comprises an inner protrusion for forming at least a portion of a start hole on one of the annular flanges, wherein the inner protrusion is arranged at least partly inside the angled portion of the annular flange cavities, the inner protrusion comprises a chamfered or concave edge for forming a chamfered or convex edge at the start hole, and the inner protrusion comprises a tapered edge, the tapered edge being substantially perpendicular to a longitudinal axis of the barrel cavity and diametrically opposed the chamfered or concave edge.

According to one exemplary embodiment, the mold may be arranged as a combination of a plurality of molds, each one being arranged as described above. Thus, more than one cable spool can be produced per mold and production efficiency is increased.

According to one exemplary embodiment, at least one of the first and second flange mold pieces comprises at least one outer protrusion for defining at least a portion of at least one start hole on the respective annular flange.

It should be understood that an outer protrusion forming at least a portion of a start hole means that a part of the depth of the start hole is formed by means of the outer protrusions, i.e. that part of the depth is formed by the inner protrusions and part of the depth by the outer protrusions.

By forming a portion of the start hole by means of an outer protrusion provided on the first and second flange mold pieces, the inner protrusions need not to be as high to create a start hole. Having inner protrusions with a large height would mean that the tapered portion of the inner protrusion would have to be very large in order to allow the central mold pieces to be removed from a cable spool produced therein without damaging the cable spool.

According to one exemplary embodiment, the at least two central mold pieces collectively comprise two inner protrusions for forming at least a portion of two start holes on one of the annular flanges, wherein the inner protrusions are arranged at east partly inside the angled portion of the annular flange cavities.

wherein the two inner protrusions comprise tapered edges, the tapered edges being substantially perpendicular to a longitudinal axis of the barrel cavity and diametrically opposed the chamfered or concave edges.

By having the mold arranged to produce a cable spool having two start holes on one of the flanges, ease of operation is achieved as the cable spool can more easily be used with automated cable winding applications.

According to one exemplary embodiment, the concave edge has a radius of 0.1-0.5 mm.

Having the concave edge provided with a radius of 0.1-0.5 mm lowers the risk of damages to the cable as the edge of the cable spool which correlates to the concave edge of the mold, i.e. the edge that the cable comes into contact with, is less sharp. The same benefit can also be achieved by providing the intersection between the inner protrusion and the flange cavity with chamfered edges.

According to one exemplary embodiment, each one of the first and second annular flange cavities is angled outwards 0.5-3.5° with respect to a plane that is perpendicular to a longitudinal axis of the barrel cavity.

Having each one of the first and second annular flange cavities angled outwards 0.5-3.5° is sufficient to allow the central mold pieces to be removed from a cable spool created therein without causing damages to the inward facing sides of the flanges of the cable spool. Also, having each one of the first and second annular flange cavities angled outwards 0.5-3.5° means that the flanges more easily can straighten once they are cooled and change shape into being substantially perpendicular to a longitudinal axis of the barrel.

It should be understood that each one of the first and second annular flange cavities being angled outwards means that the flange cavities are arranged so that the portion of a first flange cavity which is closest to the barrel cavity is the portion of the first flange cavity which is located closest to the second flange cavity. Any other portion of the first flange cavity is located at a greater distance from the second flange cavity.

According to one exemplary embodiment, the flange cavity is shaped substantially as a baseless, truncated cone, each one of the first and second annular flange cavities pointing towards the other.

The flange cavity being shaped substantially as a baseless, truncated cone is to be understood as meaning that the portion of the flange cavity which borders the barrel cavity constitutes the top portion of a truncated cone, and that the rest of the flange cavity corresponds to the lateral surfaces of a truncated cone. The portion of a first flange cavity which is closest to the barrel cavity, i.e, the portion which corresponds to the top of the truncated cone, is the portion of the first flange cavity which is located closest to the second flange cavity. Any other portion of the first flange cavity is located at a greater distance from the second flange cavity.

Having the flange cavity arranged as a baseless, truncated cone allows the flange cavity to be angled outwards, thus providing the aforementioned benefits of being so. Also, by being arrange as a baseless, truncated cone, the flange cavities can achieve a more symmetrical shape. Thus, the flanges can more easily straighten when they are cooled.

According to one exemplary embodiment, the chamfered or concave edge is the edge which is closest to the barrel cavity.

The chamfered or concave edge being the edge which is closest to the barrel cavity is beneficial as this lowers the amount of cable wear, as this edge corresponds to the edge of the cable spool which the cable comes into most contact with.

According to one exemplary embodiment, the inner protrusion comprises three chamfered or concave edges for forming a start hole comprising three chamfered or convex edges.

wherein the three chamfered or convex edges include the edge which is closest to the barrel cavity and the two edges neighboring the edge.

The inner protrusion being provided with three chamfered or concave edges is beneficial as this further reduces the amount of cable wear, due to the fact that these edges correspond to the three edges which can cause cable wear.

The mold according to the second aspect of the present invention may be used in a method according to the different embodiments of the first aspect of the present invention. The advantages described above for any of these features are also valid for the second aspect of the present invention.

According to a third aspect of the present invention, a plastic cable spool is provided, the cable spool comprising a barrel and two annular flanges located at opposite ends of the barrel, wherein each one of the flanges has an inward facing side directed towards the other flange and an outward facing side, and each one of the flanges comprises a through-hole extending between the inward facing side and the outward facing side, wherein the through-hole forms a start hole, and the through-hole has one edge on the inward facing side of the flanges being provided with a radius of 0.1-0.5 mm.

A cable spool that has a through-hole which is provided with a radius as described above is beneficial as this reduces the amount of cable wear. It is also possible to have the edge provided with a chamfering instead of providing the edge with a radius. Thus, the same benefit can be achieved.

The through-hole being provided with a radius is to be understood as meaning that at least one edge located at the intersection between the inward facing side of the flange and through-hole is rounded such that a smooth transition therebetween is achieved.

According to one exemplary embodiment, the through-hole has three edges on the inward facing side of the flanges being provided with a radius of 0.1-0.5 mm.

By providing the cable spool with a through-hole having three edges provided with a radius, the amount of cable wear is further reduced.

The three edges are to be understood as being the three edges on the inward facing side of the flanges that are located closest to the barrel of the cable spool, i.e. the edges provided on the concave side of the through-hole and the two sides neighboring the concave side.

The plastic cable spool according to the third aspect of the present invention may be produced by a method according to the different embodiments of the first aspect of the present invention and/or by using a mold according to the different embodiments of the second aspect of the present invention. The advantages described above for any of these features are also valid for the third aspect of the present invention.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The above, as well as additional objects, features and advantages of the present invention, will be better understood through the following illustrative and non-limiting detailed description of exemplary embodiments of the present invention, with reference to the appended drawing, wherein:

FIGS. 5a and 5b are cross-sectional views showing a portion of a flange of the cable spool in FIG. 4, wherein FIG. 5a shows the flange just after it has been removed from the mold and FIG. 5b shows the flange once it has cooled down.

DETAILED DESCRIPTION OF THE DRAWINGS

In the present detailed description, embodiments of a method for producing a cable spool according to the present invention are mainly discussed with reference to views showing a method for producing a cable spool with components, steps and portions being relevant in relation to various embodiments of the invention. It should be noted that this by no means limits the scope of the invention, which is also applicable in other circumstances for instance with other types or variants of cable spools than the embodiments shown in the appended drawings. Further, that specific features are mentioned in connection to an embodiment of the invention does not mean that those components cannot be used to an advantage together with other embodiments of the invention.

The invention will now by way of example be described in more detail by means of embodiments and with reference to the accompanying drawings.

Figure 1:
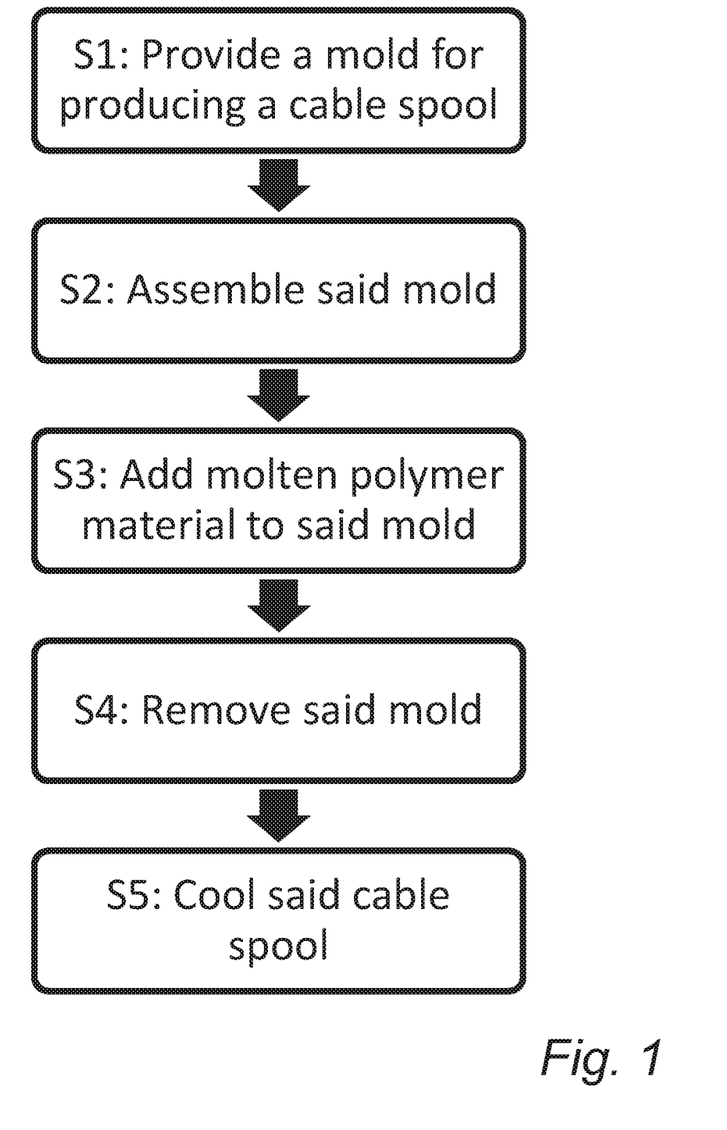
FIG. 1 is a block diagram showing the method according to the present invention.
Figure 7:
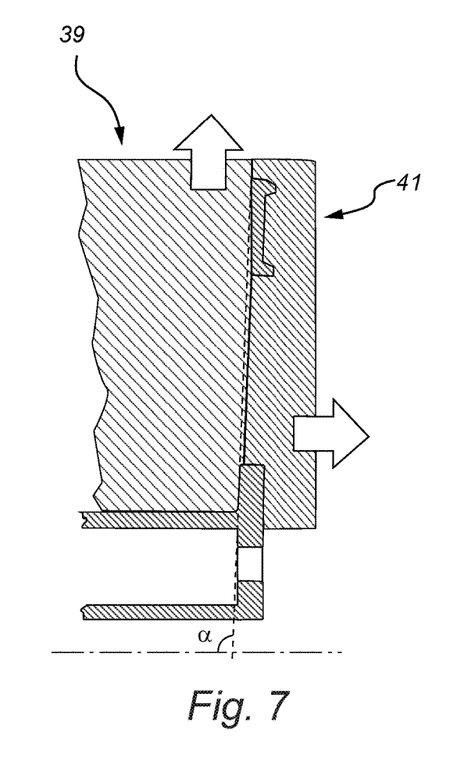
FIG. 7 is a cross-sectional view of the mold of FIG. 6 in an assembled state and a cable spool that has been produced therein.
Figure 8:
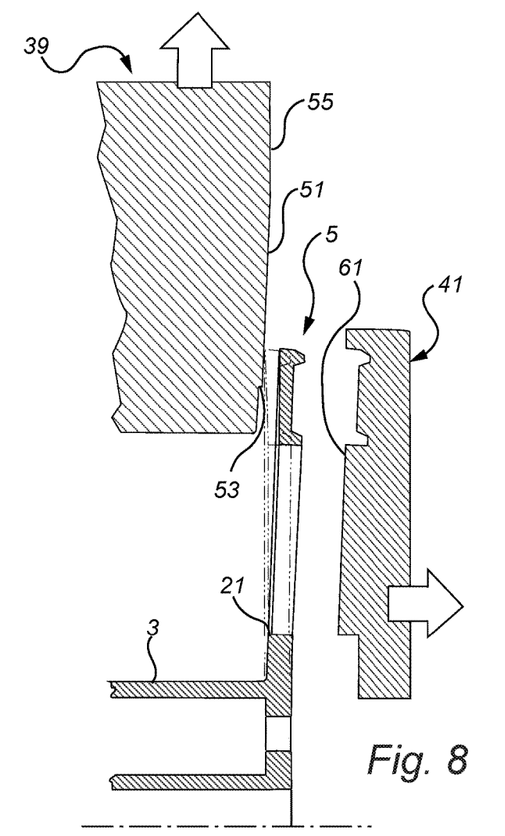
FIG. 8 is a cross-sectional view of the mold of FIG. 7 as it is being removed from the cable spool.

FIG. 1 is a block diagram showing the method according to the present invention. The first step S1 is to provide a mold 2 having at least two central mold pieces 39, a first flange mold piece 41 and a second flange mold piece 43. The mold 2 is clearly shown in FIGS. 6-8. The at least two central mold pieces 39 are arranged to collectively define a barrel cavity for producing a barrel 3 of the cable spool 1, and the first 41 and second flange mold pieces 43 are arranged to together with the at least two central mold pieces 39 define a first annular flange cavity and a second annular flange cavity 49, respectively, for producing a first and a second annular flange 5 of the cable spool 1, respectively. The first and second annular flange cavities are provided at either end of the barrel cavity when the mold 2 is assembled. At least a portion of each one of the first and second annular flange cavities is angled outwards 0.1-5° with respect to a plane that is perpendicular to a longitudinal axis of the barrel cavity. At least one of the at least two central mold pieces 39 comprises an inner protrusion 51 for forming at least a portion of a start hole 13 on one of the annular flanges 5. The inner protrusion 51 is arranged at least partly inside the angled portion of the annular flange cavities. The inner protrusion 51 comprises a concave edge 53 for forming a rounded edge at the start hole 13 having a radius 21, and the inner protrusion 51 comprises a tapered edge 55. The tapered edge 55 is substantially perpendicular to a longitudinal axis of the barrel cavity and diametrically opposed the concave edge 53. This is shown in FIGS. 7 and 8, which show a cross-section of the mold 2.

After such a mold 2 has been provided, the mold 2 is assembled and molten polymer material is added in a second S2 and third step S3, respectively. After the molten polymer material has been added, the mold 2 is removed in a fourth step S4. This is done once the molten polymer material has been given a sufficient amount of time to cool and at least partly solidify. After the mold 2 has been removed, the cable spool 1 is, in a fifth step S5, cooled by contact with ambient air. As the cable spool 1 is cooled in the ambient air, the flanges 5 straighten from being arranged at an angle greater than 90° with respect to a longitudinal axis of the barrel 3 to being arranged at an angle substantially perpendicular to the longitudinal axis of the barrel 3.

Figure 2:
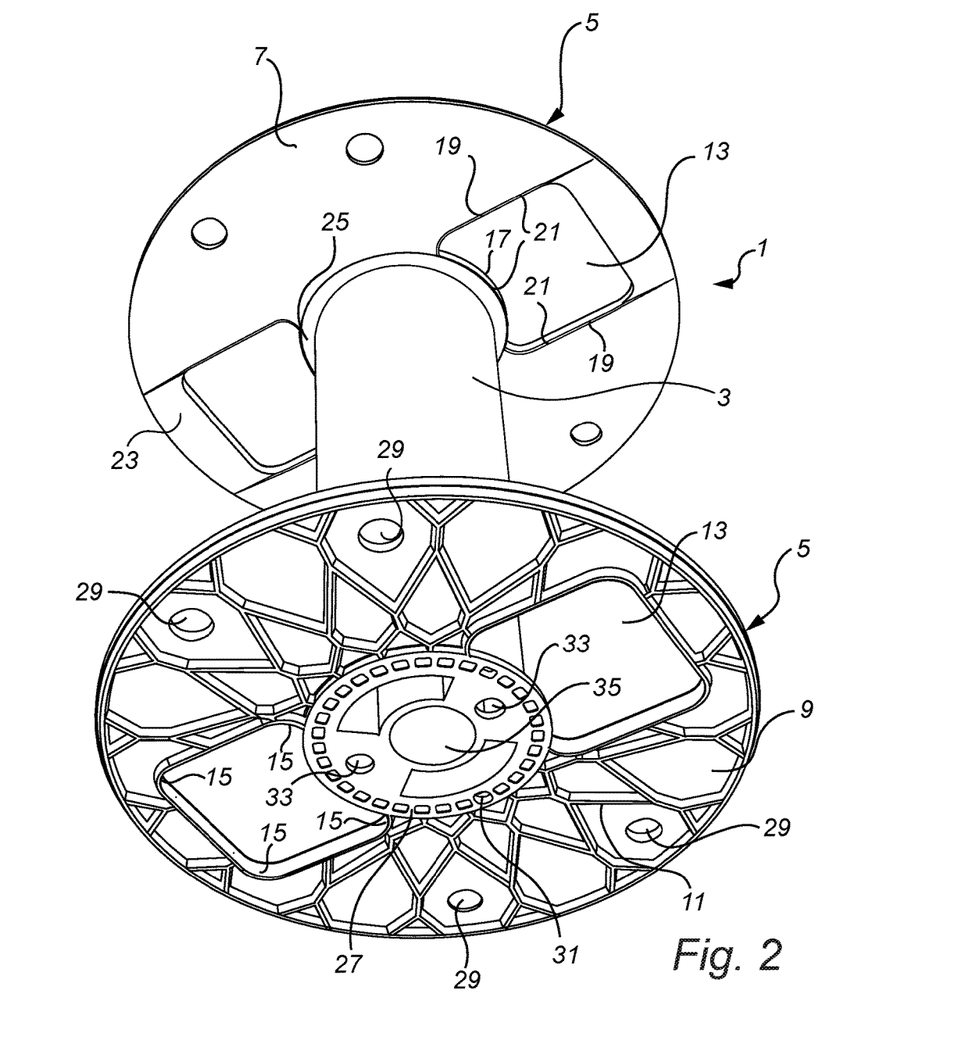
FIG. 2 is a perspective view of a cable spool according to the present invention.

FIG. 2 is a perspective view of a cable spool 1 produced according to the method illustrated in FIG. 1, the cable spool 1 comprising a barrel 3 and two annular flanges 5. The cable spool 1 is arranged to be able to hold a cable that has been wound onto the cable spool 1, either by an automated or a manual cable winding machine.

Each one of the two flanges 5 has an inward facing side 7 directed towards the other flange 5 and an outward facing side 9 directed away from the other flange 5. The inward facing sides 7 of the two flanges 5 are substantially smooth, so as to not damage the cable that is to be wound around the barrel 3 and supported by the inward facing sides 7 of the two flanges 5. Each one of the outward facing sides 9 of the two flanges 5 is provided with a radially aligned, honeycomb shaped pattern of ribs 11, which strengthens the flanges 5 so that they are less likely to fail when the cable spool 1 is fully wound.

On each one of the two flanges 5, there is provided two symmetrically distributed through-holes 13, which are adapted for receiving a cable to be wound around the barrel 3, also known as start holes. The start holes 13 extend from an inward facing side 7 to an outward facing side 9 of the flanges 5. When a cable is to be wound onto the cable spool 1, the cable is passed through the start hole 13 from the inward facing side 7 to the outward facing side 9, where it is then held in place as the cable spool 1 is rotated, thus causing the cable to be winded onto the cable spool 1. The start holes 13 are shaped as rectangles with rounded corners 15, each one having one side having a concave curvature 17 and the other three sides being straight 19. The side having a concave curvature 17 is the side which is located closest to the barrel 3. The start holes 13 are 40 mm by 50 mm, with the side having one straight 19 and one concave side 17 being the longest. The large size of the start holes 13 in relation to the diameter of the cable that is to be wound upon the cable spool 1 is due to the fact that the automated winding machines come in certain standard sizes and that this needs to be taken into consideration when designing the cable spool 1. The curvature of the concave side 17 of the start hole 13 is such that it follows the curvature of the barrel 3. The edge provided at the intersection between the inward facing side 7 of the flange 5 and the start hole 13 is, along the side having a concave curvature and the two sides neighboring this side, provided with a radius of around 0.25 mm. Thus, these edges are less likely to damage the cable that is to be wound around the cable spool 1. The edge provided on the side 19 which is diametrically opposed the side having a concave curvature 17 is provided with a tapering 23. The design of the flanges and the start holes is most clearly shown if FIGS. 5a and 5B.

Each one of the two flanges 5 further comprises an annular reinforcement portion 25 positioned between the barrel 3 and the concave side 17 of the start holes 13.

On the outward facing sides 9 of the two flanges 5, the reinforcement portion 25 is provided with a plurality of ribs 27 extending in a radial direction. Each one of the ribs 27 is around 6 mm long and 2 mm wide, Thus, the stability and strength of the cable spool 1 is increased further. On the inward facing side 7 of the two flanges 5, the reinforcement portion 25 is substantially smooth, so as to not damage the cable that is to be wound around the barrel 3 and supported by the inward facing sides 7 of the two flanges 5.

Each one of the flanges 5 of the cable spool 1 also comprises four additional, distally located holes 29 having a diameter of approximately 8 mm for securing the cable once the cable spool 1 has been fully wounded. Each one of the flanges 5 also comprises a smaller, secondary start hole 31 extending from the inward facing side 7 to the outward facing side 9 of the flanges 5. This secondary start hole 31 is located next to the barrel 3 and goes right through the annular reinforcement portion 25. The size of this secondary start hole 31 makes it unsuitable for use in automated winding application and it is therefore only used when manually winding the cable spool 1.

The barrel 3 further comprises two diametrically opposed holes 33 located at one end of the barrel and a central through-hole 35 extending through the entire length of the barrel 3. The two diametrically opposed holes 33 are used for driving the rotation of the cable spool 1 when it is used in an automated cable winding application while the central through-hole 35 is used for supporting the cable spool 1.

Figure 3:
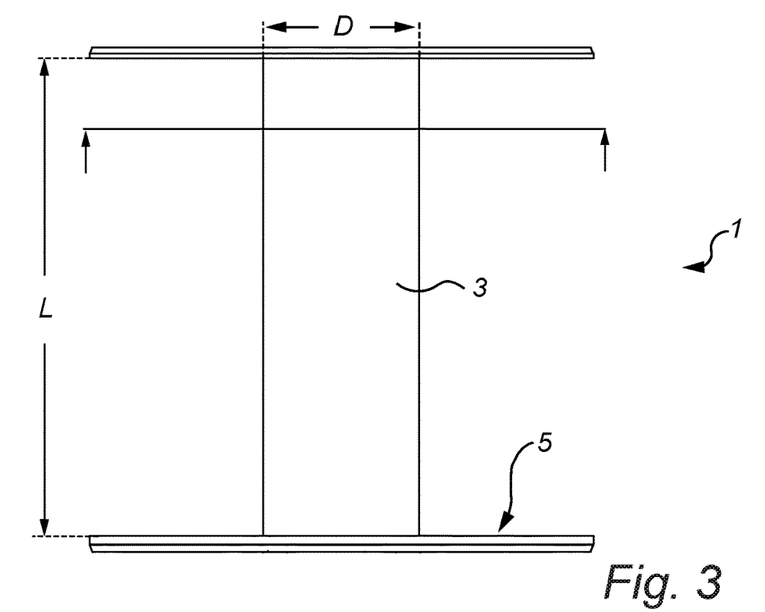
FIG. 3 is a side view of a cable spool according to the present invention.

FIG. 3 is a side view of the cable spool 1, showing an outside diameter D and a length L of the barrel 3, the outside diameter D being sufficiently large, e.g. 50 mm, so that the cable is not damaged when it is rapidly wound onto the barrel 3. The surface of the barrel 3 is substantially smooth, so as to not damage the cable that is to be wound around it.

Figure 4:
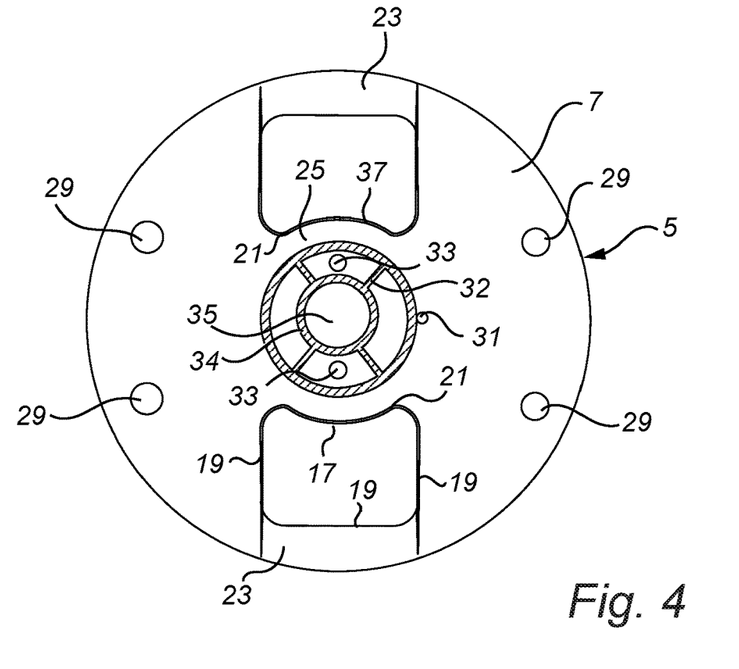
FIG. 4 is a cross-sectional view showing the inward facing side of a flange of a cable spool according to the present invention.

FIG. 4 is a cross-sectional view of the cable spool 1 showing the inward facing side 7 of a flange 5. The reinforcement portion 25 has a height of around 5 mm, measured in a radial direction from a lateral surface of the barrel 3 to a distal edge 37 of the reinforcement portion 25, i.e. around 3% of the flange diameter or around 10% of the outside diameter of the barrel 3. The distal edge 37 of the reinforcement portion 25 coincides, over at least part of the reinforcement portion 25, with the concave side 17 of the start hole 13. The barrel 3 is further provided with four spokes 32 located between an inner barrel 34 and the outer wall of the barrel 3 for ensuring that the cable spool maintains a round shape during use and as it is produced.

Figure 5A:
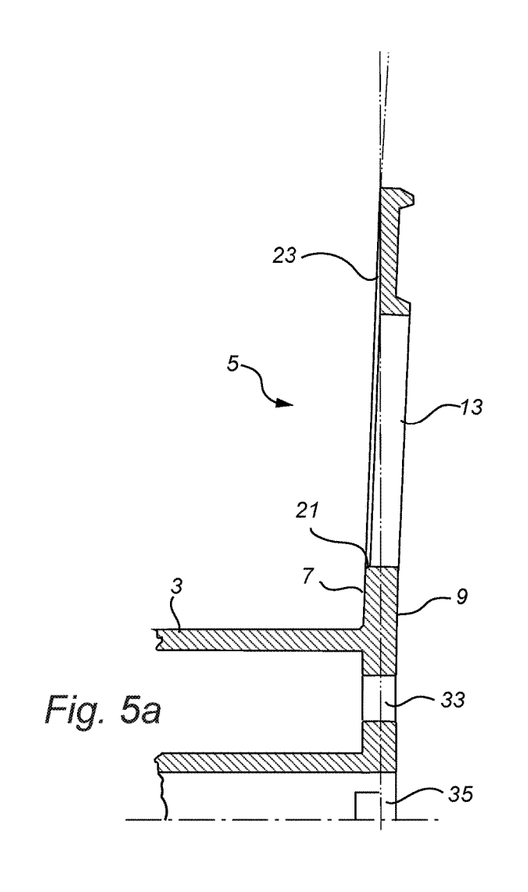
Figure 5B:
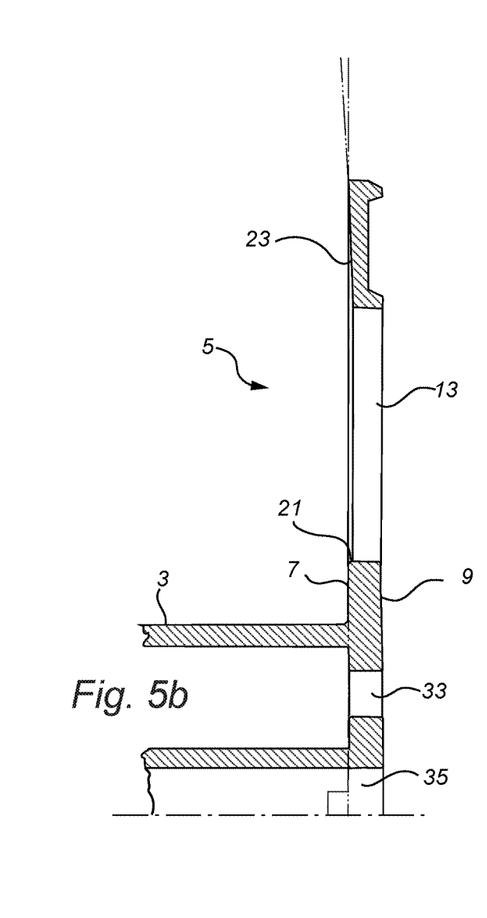

FIGS. 5a and 5b are cross-sectional views showing a portion of a flange 5 of the cable spool 1 in FIG. 4. FIG. 5a shows the flange 5 just after it has been removed from the mold 2 and FIG. 5b shows the flange 5 once it has cooled down. A reference line is provided in each one of the figures in order to better understand the angular relationship between the different portions of the flanges 5.

Figure 6:
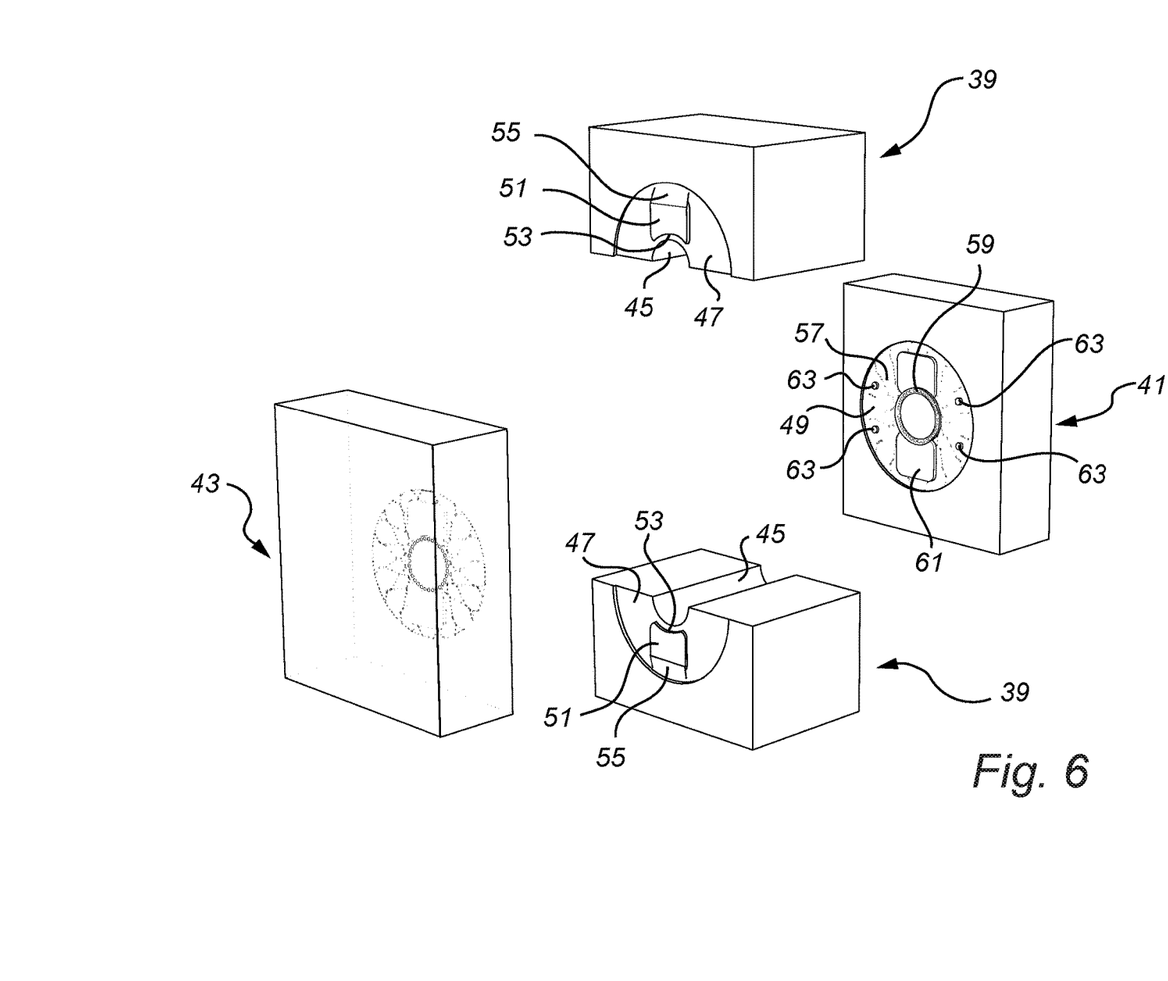
FIG. 6 is an exploded view of a mold according to the present invention.

FIG. 6 is an exploded view of a mold according to the present invention. As has been described in relation to FIG. 1, the mold has two central mold pieces 39, a first flange mold piece 41 and a second flange mold piece 43. The mold will now be described in even greater detail. Each one of the two central mold pieces 39 is provided with a recess shaped like a semicylinder 45, each one adapted for forming one half of a barrel cavity, and with two semiannular recesses 47 on either side of the semicylinder shaped recess 45, each one being adapted to form part of a flange cavity. The semicylinder shaped recess 45 is provided along the entire length of the surface of the central mold piece 39 which is to mate with a corresponding surface of the other central mold piece 39 when the mold 2 is assembled. The two semiannular recesses 47 are provided on the surfaces between which the semicylinder shaped recess 45 extends and are arranged at an angle of about 92° with respect to a longitudinal axis of the barrel cavity.

Each one of the central mold pieces 39 is further provided with an inner protrusion 51 for forming a start hole 13. These inner protrusions 51 are located in either semiannular recess 47. The inner protrusions 51 each have a height of around 1 mm. The inner protrusions 51 are shaped as rectangles with rounded corners, each one having one side having a concave curvature and the other three sides being straight. The side having a concave curvature is the side which is located closest to the part of the semicylinder shaped recess 45 which extends into the semiannular recess 47. The inner protrusions 51 are 40 mm by 50 mm, with the side having one straight and one concave side being the longest. The curvature of the concave side of the protrusion is such that it follows the curvature of the semicylinder shaped recess 45.

The edge provided at the intersection between the semiannular shaped recess 47 and the inner protrusion 51 is, along the side having a concave curvature and the two sides neighboring this side, provided with a radius of around 0.25 mm. I.e., the intersection therebetween is rounded so that there is no sharp corner between the semiannular recesses 47 and the aforementioned three sides of the inner protrusions 51. Furthermore, the edge provided on the side which is diametrically opposed the side having a concave curvature is provided with a tapering 55 such that the height of the inner protrusion 51 tapers from that edge and in a radially outwards going direction until the height is substantially zero. The tapering angle is around 2°, i.e. the surface of the tapering is substantially perpendicular to the longitudinal axis of the semicylinder shaped recess 45.

The first flange mold piece 41 is provided with an annular recess 49 for forming the outward facing side of an annular flange 5 of a cable spool 1. The first flange mold piece 41 is also provided with recesses 57 for forming a honeycomb pattern of reinforcement ribs 11 on the outside of a flange 5 and with recesses 59 for forming an annular reinforcement portion 25 as described in relation to FIG. 2.

In the annular recess 49, two outer protrusions 61 are provided. These outer protrusions 61, in combination with the inner protrusions 51 in the semiannular recesses 47 of the central mold pieces 39, form a start hole 13 in a flange 5 that is produced using this mold 2. These outer protrusions 61 have substantially the same shape as the inner protrusions 51 provided in the semiannular recess 47, with some differences being that these outer protrusions 61 have a height of around 5 mm, they are not provided with an edge having a radius 21, and they lack a tapering portion 55. The reason no tapering portion 55 is provided on these outer protrusions 61 is that the first and second flange mold pieces 41, 43 are removed from a cable spool 1 produced therein in a horizontal direction. Thus, there is no need for a tapering portion 55 to be provided as a mean for allowing the first and second flange mold pieces 41, 43 to be removed without damaging the flanges 5 of the cable spool 1.

The first flange mold piece 41 is also provided with a number of protrusions 63 for forming distally located holes 29 on the flange 5. These protrusions 63, approximately 8 mm in diameter, are located near the edge of the annular recess 57 and provided two on each side of the outer protrusions 61.

The second flange mold piece 43 is substantially identical to the first flange mold piece 41, with one difference being that the second flange mold piece 43 is provided with a sprue for injecting molten polymer material when the mold 2 is used for injection molding.

FIG. 7 is a cross-sectional view showing the mold 2 of FIG. 6 in an assembled state and a cable spool 1 that has been produced therein. The flange cavity shown is arranged at an angle α of about 92° to the longitudinal axis of the barrel cavity. The tapering 23 is substantially perpendicular to the longitudinal axis of the barrel cavity. The two arrows show in which direction the mold 2 is to be removed.

FIG. 8 is a cross-sectional view of the mold 2 of FIG. 7 as it is being removed from the cable spool 1. The central mold pieces 39 are removed by moving them in a vertical direction, and due to the angle of the flanges 5 and the tapering 55 of the inner protrusions 51, the central mold pieces 39 have a free path away from the cable spool 1 and can thus be removed without having the inner protrusion 51 damage the start holes 13 created on the flanges 5. The flange mold pieces 41, 43 are removed by moving them in a direction substantially parallel with a longitudinal axis of the barrel cavity.

The dotted line shows the position of the flange 5 after it has cooled down and straightened so that it becomes substantially perpendicular to the longitudinal axis of the barrel 3.

It should be noted that additional mold inserts are used in creating the inner cavity of the barrel, but that their design is unrelated to the present invention. Thus, they are not shown in any of the figures described herein.

Although exemplary embodiments of the present invention have been described herein, it should be apparent to those having ordinary skill in the art that a number of changes, modifications or alterations to the invention as described herein may be made. Thus, the above description of the various embodiments of the present invention and the accompanying drawings are to be regarded as non-limiting examples of the invention and the scope of protection is defined by the appended claims.

For example, the cable spool can be provided with more than two start holes, e.g. three or four start holes. The flanges could also be provided with more than one reinforcement portion. The cable spool can also be provided with more holes than the start holes, the secondary start hole, the central through-hole and the two diametrically opposed holes described herein. The cable spool could also be provided with fewer or more edges having a radius.

Furthermore, any reference signs in the claims should not be construed as limiting the scope.

The invention claimed is:

1. A method for producing a cable spool comprising the steps of:
   providing a mold for producing a cable spool, said mold comprising at least two central mold pieces, a first flange mold piece and a second flange mold piece,
      said at least two central mold pieces being arranged to collectively define a barrel cavity for producing a barrel of said cable spool, and
      said first and second flange mold pieces being arranged to together with said at least two central mold pieces define a first annular flange cavity and a second annular flange cavity, respectively, for producing a first and a second annular flange of said cable spool, respectively, said first and second annular flange cavities being provided at either end of said barrel cavity when said mold is assembled,
      wherein at least a portion of each one of said first and second annular flange cavities is angled outwards 0.1-5° with respect to a plane that is perpendicular to a longitudinal axis of said barrel cavity,
      wherein at least one of said at least two central mold pieces comprises an inner protrusion for forming at least a portion of a start hole on one of said annular flanges, wherein said inner protrusion is arranged at least partly inside said angled portion of said annular flange cavities,
      said inner protrusion comprises a chamfered or concave edge for forming a chamfered or convex edge at said start hole, and
      said inner protrusion comprises a tapered edge, said tapered edge being substantially perpendicular to a longitudinal axis of said barrel cavity and diametrically opposite said chamfered or concave edge;
   assembling said mold by joining said at least two central mold pieces and said first and second flange mold pieces;
   adding molten polymer material to said mold;
   removing said mold;
   cooling said cable spool.

2. A method according to claim 1, wherein at least one of said first and second flange mold pieces comprises at least one outer protrusion for defining at least a portion of at least one start hole on said respective annular flange.

3. A method according to claim 1, wherein said at least two central mold pieces collectively comprise two inner protrusions for forming at least a portion of two start holes on one of said annular flanges, wherein said inner protrusions are arranged at least partly inside said angled portion of said annular flange cavities,
   wherein said two inner protrusions comprise tapered edges, said tapered edges being substantially perpendicular to a longitudinal axis of said barrel cavity and diametrically opposite said chamfered or concave edges.

4. A method according to claim 1, wherein said concave edge has a radius of 0.1-0.5 mm.

5. A method according to claim 1, wherein each one of said first and second annular flange cavities is angled outwards 0.5-3.5° with respect to a plane that is perpendicular to a longitudinal axis of said barrel cavity.

6. A method according to claim 1, wherein said polymer material is polypropylene or polyethylene.

7. A method according to claim 6, wherein said polypropylene or polyethylene has a density of 0.8-1.2 kg/m$^3$.

8. A method according to claim 1, wherein said flange cavity is shaped substantially as a baseless, truncated cone, each one of said first and second annular flange cavities pointing towards the other.

9. A method according to claim 1, whereby upon cooling, said first and second annular flanges of said cable spool change shape into substantially flat discs arranged substantially perpendicular to a longitudinal axis of said barrel.

10. A method according to claim 1, wherein said chamfered or concave edge is the edge which is closest to said barrel cavity.

11. A method according to claim 1, wherein said inner protrusion comprises three chamfered or concave edges for forming a start hole comprising three chamfered or convex edges,
   wherein said three chamfered or convex edges include the edge which is closest to said barrel cavity and the two edges neighboring said edge.

12. A mold for producing a cable spool, said mold comprising:
   at least two central mold pieces, a first flange mold piece and a second flange mold piece,
      said at least two central mold pieces being arranged to collectively define a barrel cavity for producing a barrel of said cable spool, and
      said first and second flange mold pieces being arranged to together with said at least two central mold pieces define a first annular flange cavity and a second annular flange cavity, respectively, for producing a first and a second annular flange of said cable spool, respectively, said first and second annular flange cavities being provided at either end of said barrel cavity when said mold is assembled,
      wherein at least a portion of each one of said first and second annular flange cavities is angled outwards 0.1-5° with respect to a plane that is perpendicular to a longitudinal axis of said barrel cavity,
      wherein at least one of said at least two central mold pieces comprises an inner protrusion for forming at least a portion of a start hole on one of said annular flanges, wherein said inner protrusion is arranged at least partly inside said angled portion of said annular flange cavities,
      said inner protrusion comprises a chamfered or concave edge for forming a chamfered or convex edge at said start hole, and
      said inner protrusion comprises a tapered edge, said tapered edge being substantially perpendicular to a longitudinal axis of said barrel cavity and diametrically opposite said chamfered or concave edge.

13. A mold according to claim 12, wherein at least one of said first and second flange mold pieces comprises at least one outer protrusion for defining at least a portion of at least one start hole on said respective annular flange.

14. A mold according to claim 12, wherein said at least two central mold pieces collectively comprise two inner protrusions for forming at least a portion of two start holes on one of said annular flanges, wherein said inner protrusions are arranged at least partly inside said angled portion of said annular flange cavities, wherein said two inner protrusions comprise tapered edges, said tapered edges being substantially perpendicular to a longitudinal axis of said barrel cavity and diametrically opposite said chamfered or concave edges.

15. A mold according to claim 12, wherein said concave edge has a radius of 0.1-0.5 mm.

16. A mold according to claim 12, wherein each one of said first and second annular flange cavities is angled outwards 0.5-3.5° with respect to a plane that is perpendicular to a longitudinal axis of said barrel cavity.

17. A mold according to claim 12, wherein said flange cavity is shaped substantially as a baseless, truncated cone, each one of said first and second annular flange cavities pointing towards the other.

18. A mold according to claim 12, wherein said chamfered or concave edge is the edge which is closest to the barrel cavity.

19. A mold according to claim 12, wherein said inner protrusion comprises three chamfered or concave edges for forming a start hole comprising three chamfered or convex edges, wherein said three chamfered or convex edges include the edge which is closest to said barrel cavity and the two edges neighboring said edge.

* * * * *